P. C. FORRESTER.
FILTER.
APPLICATION FILED MAR. 22, 1919.

1,349,056.

Patented Aug. 10, 1920.
3 SHEETS—SHEET 1.

INVENTOR
Peter C. Forrester
BY
ATTORNEY

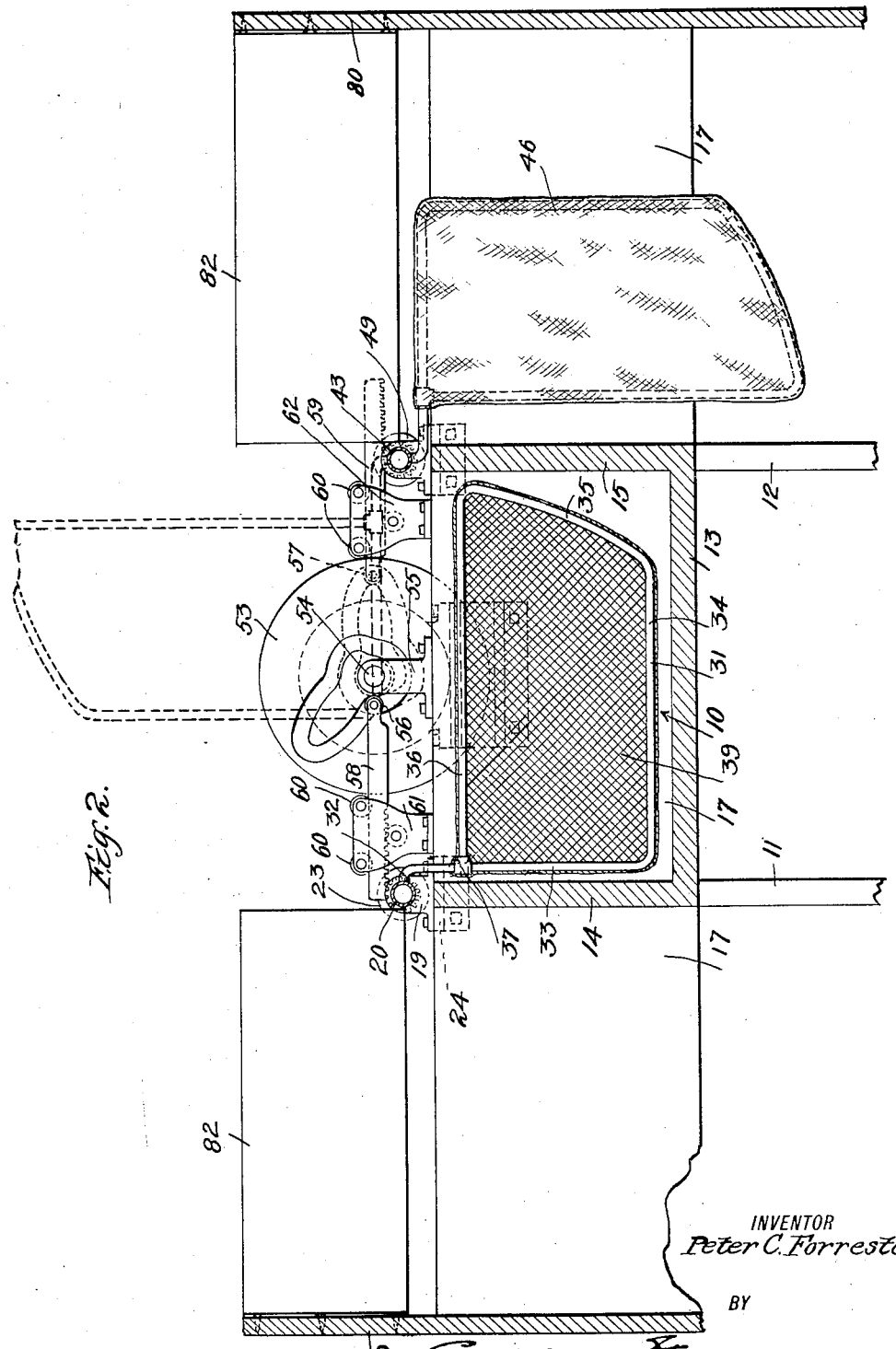

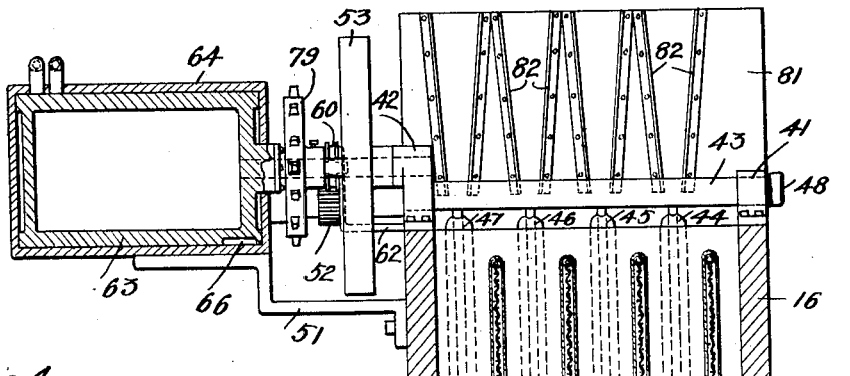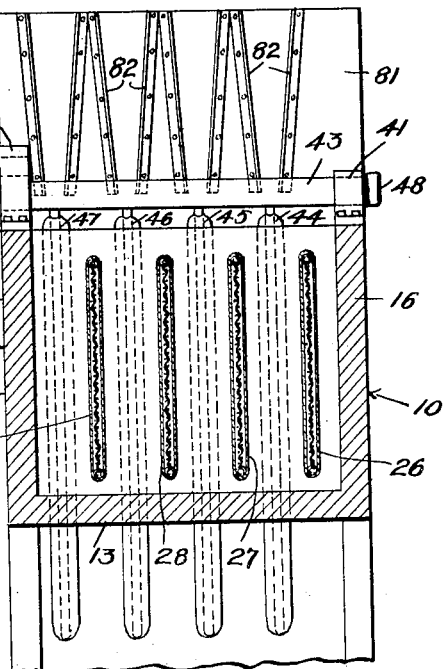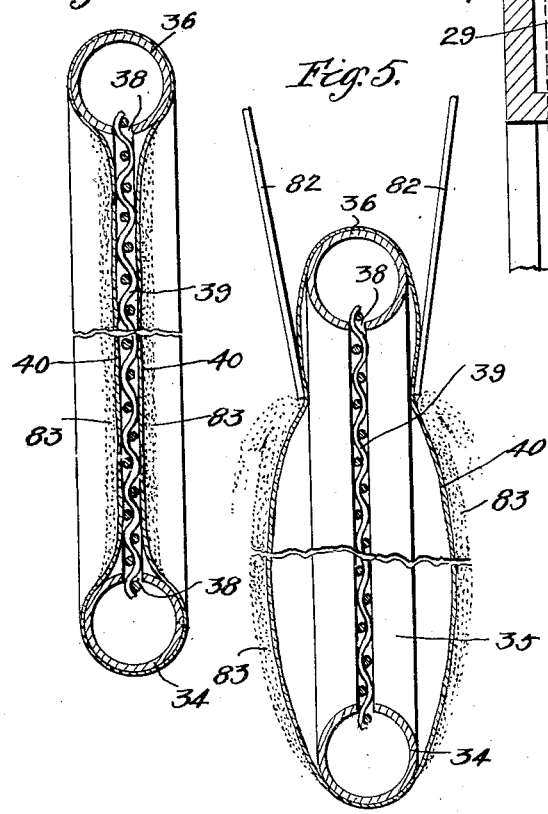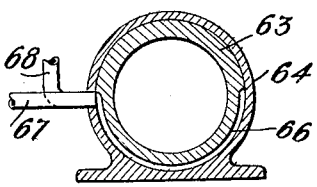

UNITED STATES PATENT OFFICE.

PETER C. FORRESTER, OF WEST TACOMA, WASHINGTON.

FILTER.

1,349,056.  Specification of Letters Patent.  Patented Aug. 10, 1920.

Application filed March 22, 1919. Serial No. 284,495.

*To all whom it may concern:*

Be it known that I, PETER C. FORRESTER, a citizen of the United States, residing at West Tacoma, in the county of Pierce and State of Washington, have invented new and useful Improvements in Filters, of which the following is a specification.

My invention relates to filtering apparatus, designed to be used in the various industries for filtering and straining solutions such as kaolin, feldspar, cyanamid, clay, carbonate of lime, bicarbonate of soda, calcium oxalate, salt, sugar, paints, etc., and separating the liquid and solid portions thereof, as well as in the various processes of the mining industry such as for cyaniding or flotation purposes.

My invention contemplates the provision of a suitable reservoir in which the solution is held and maintained at a constant level, a pair of filtering devices each composed of a plurality of filtering members, which are adapted to be alternately projected into and out of the reservoir, means for automatically applying suction to the filtering members to strain the liquid therethrough, means for automatically drying the solid portion of the solution, means for removing the dried cake from the filtering members and means for automatically governing these operations.

The main object of my invention is to regulate the time intervals of the various above described operations, in proportion to their requirements.

A further object of my invention is to provide an apparatus which will be performing substantially all of the required operations at the same time, whereby a maximum output may be obtained.

A still further object of my invention is to provide an apparatus whereby the entire surface of the filtering members may be presented to the various operations at the same time.

Other objects of my invention will appear in the following description and will be pointed out in the appended claims.

Referring to the accompanying drawings:

Figure 1— represents a plan view of my apparatus, some of the parts being shown somewhat out of proportion, in order that the detailed construction may be brought out more clearly.

Fig. 2— is a longitudinal section of the same taken on the line 2—2 of Fig. 1 viewed in the direction indicated by the arrows.

Fig. 3— is a transverse section of the same, taken on the line 3—3 of Fig. 1 viewed in the direction indicated by the arrows.

Fig. 4— is an enlarged transverse section through one of the filtering members.

Fig. 5— is an enlarged transverse section through one of the filtering members and a pair of the scraping members, illustrating the method of removing the dried cake or solid portion of the solution therefrom.

Fig. 6— is a section through the valve illustrating one of the posts with relation to the inlet and outlet pipes.

Referring more specifically to the accompanying drawings, 10 represents a reservoir adapted to receive the solution to be filtered, said solution being preferably admitted to the reservoir through a pipe having a valve (not shown) which is automatically controlled in any well known manner to maintain the solution at a constant level. The reservoir 10 is supported on the legs 11 and 12 and is provided with the bottom 13, ends 14 and 15 and sides 16 and 17.

Mounted to rock in the bearings 18 and 19 is the pipe 20 which forms the main shaft and conduit of one group of filtering members. This pipe is arranged just above the end wall 14 of the reservoir 10 and is closed at one end by the cap 21 and has secured to it at a point near its opposite end the pinion 22. The extreme end of the pipe 20 is open and projects into a hollow transferring member in the form of cylindrical chamber 23, which is secured to the side of the reservoir 10 by means of the bracket 24, and in order to maintain a fluid tight joint between the pipe and cylinder a packing gland 25 is provided in the end of the cylinder.

A plurality of filtering members 26, 27, 28 and 29 spaced suitably apart are secured to the pipe 20, and are adapted to be projected into and out of the reservoir 10 upon a rocking movement of said pipe, and as each of these filtering members are identical in construction, a description of one will suffice for all. The filtering members may be constructed in many different ways to secure the desired result, as for instance the way illustrated, which comprises a piece of pipe 31, one end of which is threaded into an aperture in the pipe 20 as at 32, and then bent downwardly as at 33, then horizontally as at 34, then upwardly as at 35, then horizontally as at 36, the end being joined to the portion 33 by the T fitting 37, thus forming a frame of substantially rectangular formation. The inwardly projecting surfaces of the portion of the pipe forming the frame are slotted as at 38 (see Figs. 3 and 4) to receive the edges of a rectangular piece of wire screening 39 of any desired mesh. This frame is completely surrounded by the filtering material 40 preferably composed of some woven material of any desired mesh, such as cheese cloth or burlap.

Mounted just above the wall 15 of the reservoir 10 to rock in the bearings 41 and 42, is the pipe 43 which forms the main shaft and conduit for the second group of filtering members 44, 45, 46 and 47, which are identical in construction to the first group mentioned and need no further description. These members 44, 45, 46 and 47 are staggered with relation to the members 26, 27, 28 and 29, in order that these two groups of members may readily pass by each other during their rocking motions.

One end of the pipe 43 is closed by the cap 48, and the other end of said pipe projects into the transferring member in the form of a cylindrical chamber 49 which is provided with a packing gland 50, and is supported by the bracket 51 secured to the side of the reservoir. The pipe 43 has secured thereto the pinion 52 through which the rocking movement of said pipe is imparted.

It will be seen by the foregoing description that the two groups of filtering members are adapted to be projected into and out of the reservoir alternately, and to this end I provide the cam 53 which is secured to the shaft 54 journaled in the bearing 55 secured to the side wall 17 of the reservoir. The cam 53 is provided on opposite surfaces with cam grooves, in which engage the rollers 56 and 57 secured respectively to the rack bars 58 and 59 which in turn mesh with the pinions 22 and 52 secured to the shafts 20 and 43, and in order that said rack bars may be guided properly, I provide the anti-frictional rollers 60 supported on the brackets 61 and 62 through which said rack bars pass.

By the foregoing description it is obvious that any desired motion of the filtering members may be attained by the formation of the grooves in the cam 53, and as at present contemplated I propose to arrange these cam grooves so that the filtering members will remain in the reservoir a definite length of time, during which time, suction is applied to said members, they are then drawn out of the reservoir to a position shown in dotted lines in Fig. 2 of the drawings, and pause long enough to drain, or be subjected to a drying process, they then pass through the scraping members, which will be hereinafter described, and are inflated, and upon a return stroke the cake is scraped off. In order to apply the sucking, drying and inflating actions in proper timed relation with the filtering members, the following valve mechanism is employed. Secured to the shaft 54 is the rotary valve block 63 which is mounted in the casing 64 supported on the bracket 65 secured to the side of the reservoir 10. The block 63 is provided with a series of peripheral segmental grooves, one of which is illustrated at 66 of Fig. 6, and is typical of all of the others. The groove 66 is broad enough to register with the pipes 67 and 68 which are threaded into the casing 64, the pipe 67 leading from said casing to the sleeve 23 and the pipe 68 leading from said casing to a suction pump (not shown).

Pipes 69 and 70 register at predetermined intervals with another groove 66, the pipe 69 leading to the sleeve 23 and the pipe 70 leading to a source of steam or hot air supply under low pressure. Pipes 71 and 72 are adapted to register with another groove 66, pipe 71 leading to the sleeve 23 and pipe 72 to a source of air or steam under a higher pressure. The pipes 73 and 74, 75 and 76, and 77 and 78 serve in a similar manner to be respectively opened and closed to communication with the sleeve 49 through a series of grooves 66 in the block 63 to the suction pump, the hot air or steam under low pressure and the air or steam under a higher pressure.

The shaft 54 on which the cam 53 and valve block 63 are secured, is provided with a sprocket wheel 79 adapted to be driven through the medium of a chain geared to a power driven counter shaft (not shown).

The walls 16 and 17 of the reservoir 10 extend outwardly from the walls 14 and 15 and at their ends are joined together by the walls 80 and 81 to which are secured the scraping members 82. These scraping members are designed to remove the cake or solid substance from the filtering members and may be of any suitable construction, as for instance as shown, which consist of pieces of sheet metal arranged in pairs and bent at right angles at one end, in order that they may be secured by means of screws to the walls 80 and 81. Each pair of the scraping members are inclined toward each other from their tops to their bottoms, thus forming a throat wide at the top and narrow at the bottom, through which a filtering member is adapted to pass. After the filtering members have passed downwardly through the throats formed by the scraping members 82, they are inflated as previously described, and upon their upward stroke the cake or solid substance 83, formed on the outer surface of the filtering fabric 40, becomes engaged with the lower edges of said scraping members and is scraped therefrom, as clearly illustrated in Fig. 5 of the drawings.

The operation of my apparatus is as follows: Power is applied to the shaft 54 which causes the cam 53 and the valve block 63 to rotate continuously and at a uniform speed. The cam grooves in the cam 53 serve to actuate the rack bars 58 and 59 which in turn operate through the pinion 22 and 52 to rock the hollow shafts 20 and 43 alternately thereby causing the filtering members attached thereto to move into and out of the reservoir.

The cam grooves in the cam 53 may be of any desired shape in order to regulate the movement of the filtering members, for instance as shown, which contemplates the immersion of a filtering member in the solution for a predetermined and necessary length of time, during which time the valve acts to open communication between the suction pump and filtering member. The cam groove then acts to lift the filtering member out of the solution to a position shown in dotted lines in Fig. 2 when it pauses, and is subjected to the drying action, which may be accomplished by the admission of hot air or steam to its interior controlled by the valve, as previously described, or by a blast of air from a blower (not shown) on its exterior. The filtering member then passes rapidly down through the throat formed by the scraping members when the valve acts to admit air or steam to inflate said member. It then passes upwardly through the throat during which time the cake or solid matter is scraped off, and then back into the reservoir.

What I claim is:

1. A filtering apparatus, comprising a reservoir, a filtering member mounted adjacent said reservoir, means for moving said filtering member into and out of said reservoir, means for straining the liquid through said filtering member when in said reservoir, and means for drying the cake formed on said filtering member when out of said reservoir.

2. A filtering apparatus, comprising a reservoir, a filtering member mounted adjacent said reservoir, means for moving said filtering member into and out of said reservoir, means for straining the liquid through said filtering member when out of said reservoir, means for drying the cake formed on said filtering member when out of said reservoir, and means for removing the cake from said filtering member.

3. A filtering apparatus, comprising a reservoir, a pair of filtering members mounted adjacent said reservoir, means for alternately moving said filtering members into and out of said reservoir, and means for straining the liquid through said filtering members when in said reservoir.

4. A filtering apparatus, comprising a reservoir, a filtering member mounted adjacent said reservoir, a cam operated mechanism for moving said filtering members into and out of said reservoir and means for operating said cam.

5. A filtering apparatus, comprising a reservoir, a filtering member pivoted adjacent thereto, a cam operated mechanism for moving said filtering member into and out of said reservoir, a valve operated means for applying suction to said filtering member and means for operating said cam and valve in timed relation.

6. A filtering apparatus, comprising a reservoir, a filtering member pivoted adjacent thereto, a cam operated mechanism for moving said filtering member into and out of said reservoir, a valve operated means for controlling a plurality of communicating passages to said filtering member, said cam and valve being adapted to operate in timed relation, and means for imparting motion to said cam and valve.

7. A filtering apparatus, comprising a reservoir, a pair of filtering members pivoted adjacent said reservoir, a cam operated mechanism for moving said filtering members alternately into and out of said reservoir, means for controlling passages leading to said filtering members, and means for operating said cam and passage controlling means in timed relation.

8. A filtering apparatus, comprising a reservoir, a rock shaft mounted adjacent said reservoir, a plurality of filtering members secured to said rock shaft, and means for rocking said shaft whereby said filtering members may be moved into and out of said reservoir.

9. A filtering apparatus, comprising a reservoir, a hollow rock shaft mounted adjacent said reservoir, a filtering member secured to said hollow rock shaft and having a communicating passage leading thereto, means for applying suction to said hollow rock shaft, and means for rocking said shaft.

10. A filtering apparatus, comprising a reservoir, a pair of rock shafts mounted adjacent said reservoir and arranged opposite each other, a plurality of filtering members secured to each rock shaft in staggered relation with each other, and means for rocking said shafts to move the filtering members into and out of said reservoir.

11. A filtering apparatus, comprising a reservoir, a shaft pivoted adjacent said reservoir and carrying one or more filtering members, a toothed segment secured to said shaft, a rack-bar engaging with said toothed segment, a cam engaging with said rack-bar and means for operating said cam.

12. A filtering apparatus, comprising a reservoir, a pair of hollow rock shafts pivoted adjacent said reservoir and disposed opposite each other, a plurality of filtering members having communicating passages secured to each of said rock shafts, a transferring member for each hollow shaft, a plurality of valves, communicating members leading from said valves to said transferring members, communicating members leading from said valves to a source of supply, a rack-bar for each hollow shaft adapted to rock said shafts, a cam for operating said rack-bar, and means for operating said valves and cam in timed relation.

In witness that I claim the foregoing I have hereunto subscribed my name this 6th day of January.

PETER C. FORRESTER.